C. D. McCORMACK.
AUTOMOBILE ATTACHMENT.
APPLICATION FILED FEB. 25, 1916.
1,235,215.
Patented July 31, 1917.
2 SHEETS—SHEET 1.
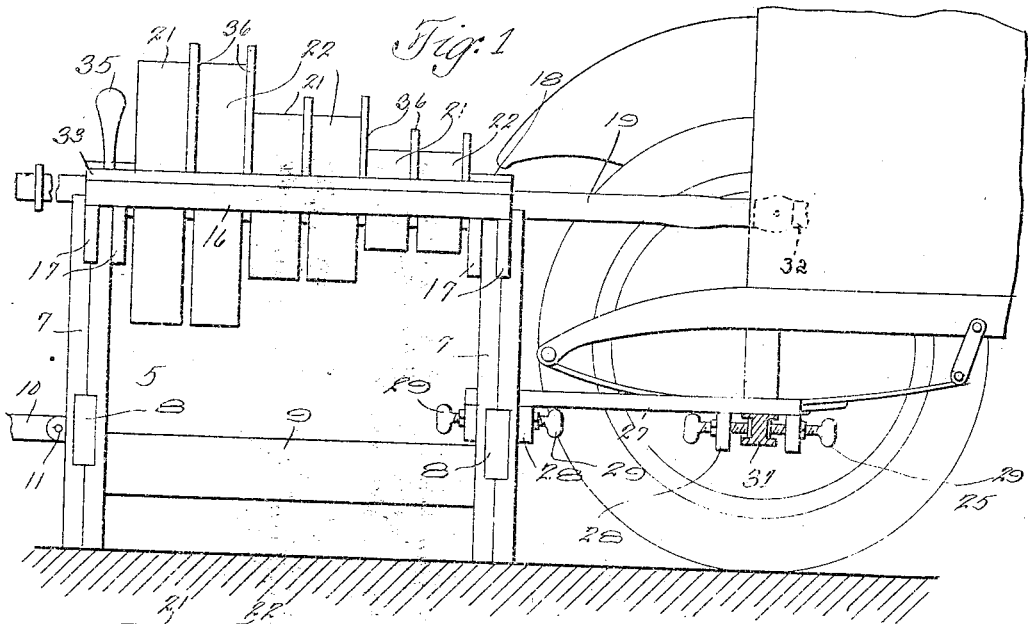
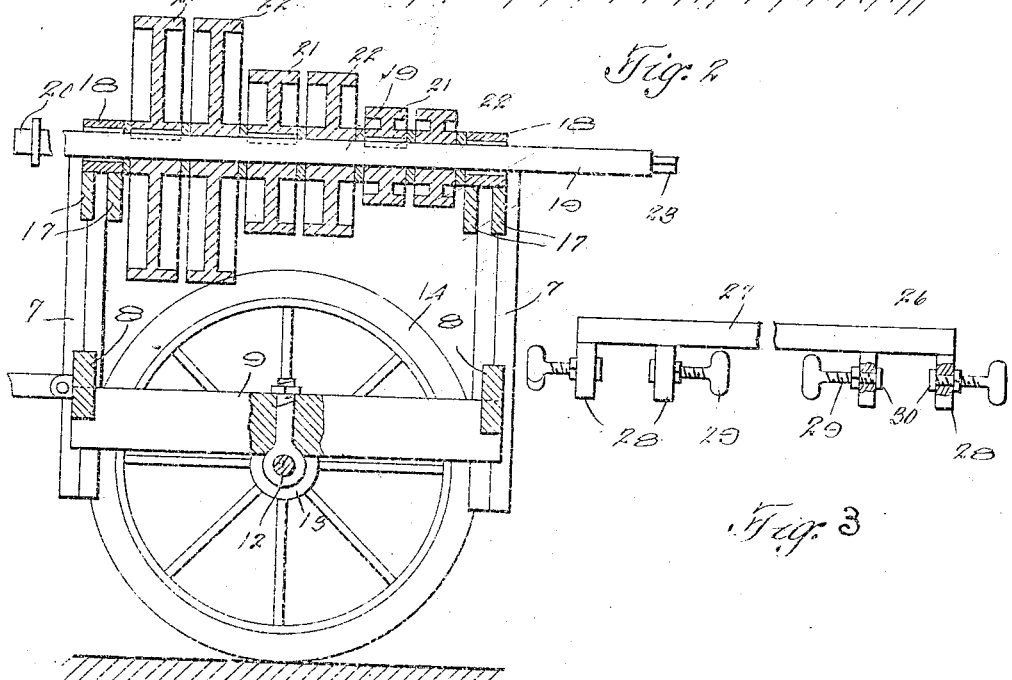
Inventor
C. D. McCormack

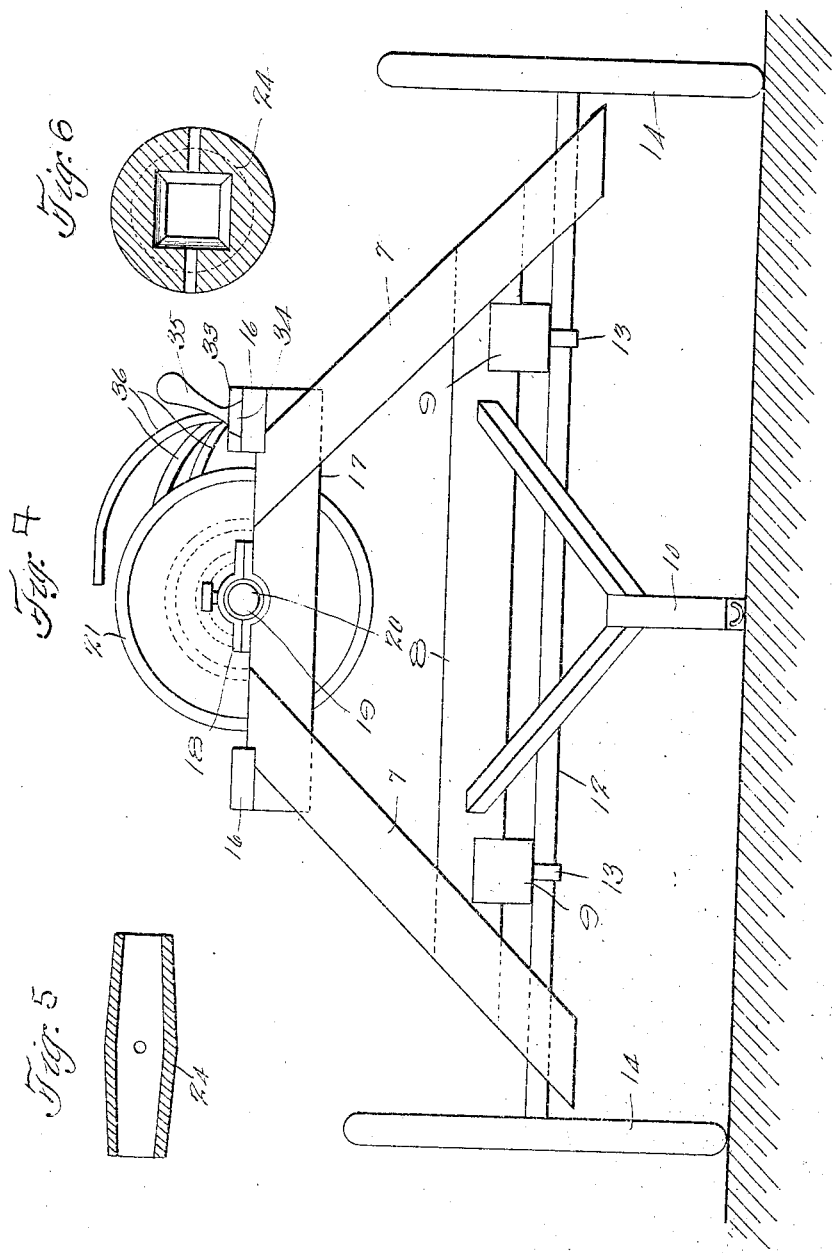

UNITED STATES PATENT OFFICE.

COY D. McCORMACK, OF WAYNOKA, OKLAHOMA.

AUTOMOBILE ATTACHMENT.

1,235,215.

Specification of Letters Patent.     Patented July 31, 1917.

Application filed February 25, 1916.   Serial No. 80,440.

*To all whom it may concern:*

Be it known that I, COY D. MCCORMACK, a citizen of the United States, residing at Waynoka, in the county of Woods and State of Oklahoma, have invented certain new and useful Improvements in Automobile Attachments; and I do hereby declare the following to be a full, clear, and exact description of the invention, such as will enable others skilled in the art to which it appertains to make and use the same.

This invention relates to attachments for automobiles, and has for its object to provide a portable device attachable to the crank shaft of a motor vehicle engine for utilizing the power of the latter in driving farm, shop or other machinery.

Another object is the provision of means for rigidly securing the attachment in proper position with relation to the body frame of the motor vehicle so as to retain the crank shaft and driven shaft in line.

With these and other objects in view, the invention consists in the novel construction, combination and arrangement of parts as will be hereinafter specifically described, claimed and illustrated in the accompanying drawings, in which:

Figure 1 represents a fragmental side elevation of a motor vehicle, illustrating the attachment applied to use.

Fig. 2 represents a longitudinal sectional view through the attachment removed.

Fig. 3 represents a plan view of one of the attaching elements removed.

Fig. 4 represents a front elevation of the attachment.

Fig. 5 represents a longitudinal sectional view through the shaft coupling, and

Fig. 6 represents a transverse sectional view through the coupling on the line 6—6 of Fig. 1.

Referring to the drawing in detail, wherein similar reference numerals designate corresponding parts throughout the several views, the numeral 5 indicates generally the supporting frame of the attachment, which includes a horizontally disposed rectangular frame 6 supported at the corners thereof on a plurality of downwardly diverging supporting legs 7. Adjacent their lower ends the legs 7 are connected by the horizontally disposed braces 8, which latter are connected by a pair of spaced horizontally disposed longitudinal braces 9. A tongue 10 is pivotally secured at 11 to the bracing member 8 at the front end of the frame and a supporting axle 12 is detachably secured adjacent the center and under the longitudinal braces 9 by I bolts 13. The opposite ends of the axle 10 are mounted in the hubs of supporting wheels 14, whereby the frame 5 may be conveniently transported.

The horizontal rectangular frame 6 includes the side and end members 16 and 17, respectively. Bearings 18 are supported upon the end members 17 and rotatably receive a driven shaft 19, having a starting pin in the front end thereof, as indicated at 20, to receive a starting crank for starting the engine of the motor vehicle, as will be more fully explained hereinafter.

A plurality of graduated pairs of drive and idle pulleys 21 and 22, respectively, are arranged upon the shaft 19 between the two end members 17 of the frame 6 and are adapted to receive the power transmitting belt, whereby the rotary movement of the drive pulleys 21 is transmitted to any desired point.

The rear end of the crank shaft 19 is squared, as indicated at 23, and is snugly fitted in one end of a shaft coupling 24, having an angular bore shaped conformably with the external contour of the flared end 23 of the driven shaft. The central portion of the bore of the coupling 24 is gradually increased in diameter so as to permit slight universal movement of the coupling upon the end of the shaft.

The frame 5 is firmly held in position in front of the motor vehicle, designated generally by the numeral 25, by a plurality of attaching elements, designated generally by the numerals 26, each attaching element including a bar 27 having pairs of spaced ears 28 projecting laterally from the opposite ends thereof and formed with internally screw threaded apertures receiving the clamping screws 29, having headed inner ends 30 adapted to engage the rear brace 8, and the axle 31 of the motor vehicle.

The crank or drive shaft 32 of the motor vehicle is squared so as to snugly fit in the outer end of the bore of the coupling 24 opposite the driven shaft 19, whereby power is transmitted from the drive shaft 32 to the driven shaft 19.

A pair of guides 33 are secured in spaced relation upon one of the side members 16 of the rectangular frame 6 and receive a slide bar 34, having a handle 35 at one end and a plurality of pairs of belt shifting fingers 36 adapted to embrace a drive belt arranged over one of the pulleys 21 or 22 to shift the latter from the driving to the loose pulleys.

In moving the automobile attachment to and from the vehicle, the axle 12 is attached to the longitudinal braces 9 by the I bolts 13 so as to facilitate convenient transportation of the attachment. When in use, the axle 12 and wheels 14 are removed and the driven shaft 19 is coupled with the drive shaft 32 by the shaft coupling 24. The frame 5 is secured to the frame of the motor vehicle in such position as to axially line the driven shaft 19 with the drive shaft 22 by clamping the rear brace 8 between the screws 29 and also clamping the axle 31 between the screws 29 at the opposite ends of the attaching bars 27. In order to start the vehicle propelling engine when the attachment is connected with the crank shaft 32 thereof the usual type of starting crank is applied to the starting pin 20 of the driven shaft 19 and rotated so as to operate the engine.

What I claim is:

1. An automobile attachment including a supporting frame, a shaft mounted in said frame, attaching bars, means for attaching one end of the bars to the frame, adjustable means for attaching the opposite ends of the bars to a vehicle axle, and means for attaching said shaft to the crank shaft of a motor vehicle engine.

2. An automobile attachment including a frame including supporting legs and horizontal braces connected therewith, supporting wheels detachably connected with said frame, means for attaching said braces to the axle of a motor vehicle, a driven shaft rotatably mounted in said frame, and means for connecting said driven shaft with the engine shaft of the automobile.

3. An automobile attachment including a supporting frame, a driven shaft mounted in said frame, attaching bars, laterally projecting ears arranged in pairs adjacent the opposite ends of said bars and adapted to engage the front axle of a motor vehicle and a member of said frame, clamping screws threaded in said ears adapted to engage the part of the frame and the vehicle axle to rigidly connect the frame and vehicle, and means for connecting said driven shaft with the engine shaft of a motor vehicle.

In testimony whereof I affix my signature in presence of two witnesses.

COY D. McCORMACK.

Witnesses:
W. R. BARRICH,
W. A. WILLEY.